(12) United States Patent
Opatt et al.

(10) Patent No.: US 6,743,382 B2
(45) Date of Patent: Jun. 1, 2004

(54) METHOD OF INSTALLING A REFRACTORY LINING

(75) Inventors: William M. Opatt, Galloway, OH (US); Douglas K. Doza, Hilliard, OH (US)

(73) Assignee: Allied Mineral Products, Inc., Columbus, OH (US)

( * ) Notice: Subject to any disclaimer, the term of this patent is extended or adjusted under 35 U.S.C. 154(b) by 510 days.

(21) Appl. No.: 09/908,434

(22) Filed: Jul. 18, 2001

(65) Prior Publication Data

US 2003/0015812 A1 Jan. 23, 2003

(51) Int. Cl.⁷ .......................... B28B 1/087; B28B 21/00
(52) U.S. Cl. ............................. 264/30; 264/69; 264/71; 264/109; 264/123
(58) Field of Search .............................. 264/30, 69, 71, 264/109, 123

(56) References Cited

U.S. PATENT DOCUMENTS

| 2,943,240 A | | 6/1960 | Martinet ...................... 266/43 |
|---|---|---|---|
| 3,754,066 A | | 8/1973 | Black .......................... 264/71 |
| 3,963,815 A | * | 6/1976 | Ezaki et al. .................. 264/30 |
| 4,279,844 A | | 7/1981 | Danjyo et al. ................ 264/30 |
| 4,400,334 A | | 8/1983 | Okuda et al. ................. 264/30 |
| 4,534,730 A | | 8/1985 | Kraus ........................... 432/3 |
| 4,632,168 A | * | 12/1986 | Noble ......................... 164/33 |
| 4,762,305 A | | 8/1988 | Rice ........................... 266/281 |
| 4,830,534 A | | 5/1989 | Schmelzer et al. ......... 404/117 |
| 4,977,115 A | | 12/1990 | Klein et al. ................. 501/107 |
| 5,222,097 A | | 6/1993 | Powell et al. ............... 373/159 |
| 5,953,363 A | | 9/1999 | Cao ............................. 373/161 |

FOREIGN PATENT DOCUMENTS

JP       08-219659        8/1996     ............. F27D/1/16

* cited by examiner

*Primary Examiner*—Stephen J. Lechert, Jr.
(74) *Attorney, Agent, or Firm*—Porter, Wright, Morris & Arthur, LLP

(57) ABSTRACT

A method of installing a refractory lining in a coreless or channel electric induction furnace. For installation of a refractory lining in a furnace wall, the method comprises the steps of providing a dry refractory material between a liner form placed within the furnace and a furnace wall, placing at least one variable frequency/amplitude electric vibrator in operational communication with an element selected from a structural member of the furnace, the liner form, and a vibrator rig placed within the furnace, inducing flow of the dry refractory material by operating at least one variable frequency/amplitude vibrator in a first operational mode having a high amplitude, low frequency vibration, and compacting the dry refractory material by operating at least one variable frequency/amplitude vibrator in a second operational mode having low amplitude, high frequency vibration after inducing flow of the dry refractory material. Methods of installing a refractory lining in a furnace floor and an inductor of a channel induction furnace also are described

34 Claims, 10 Drawing Sheets

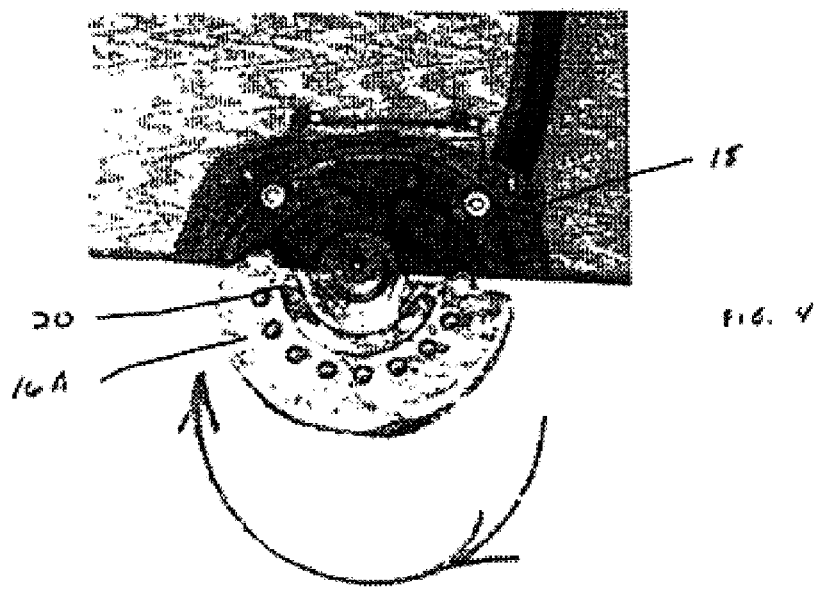
Clockwise (CW)
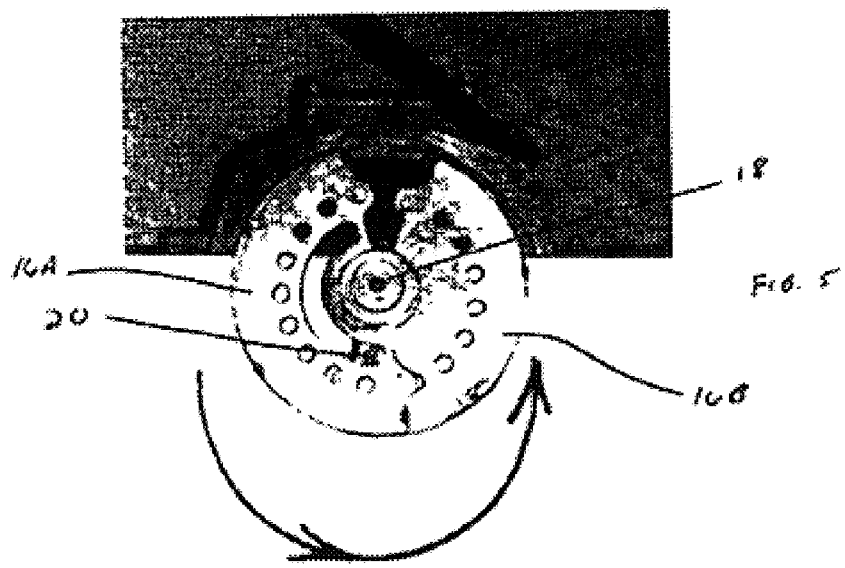
Counter-Clockwise (CCW)

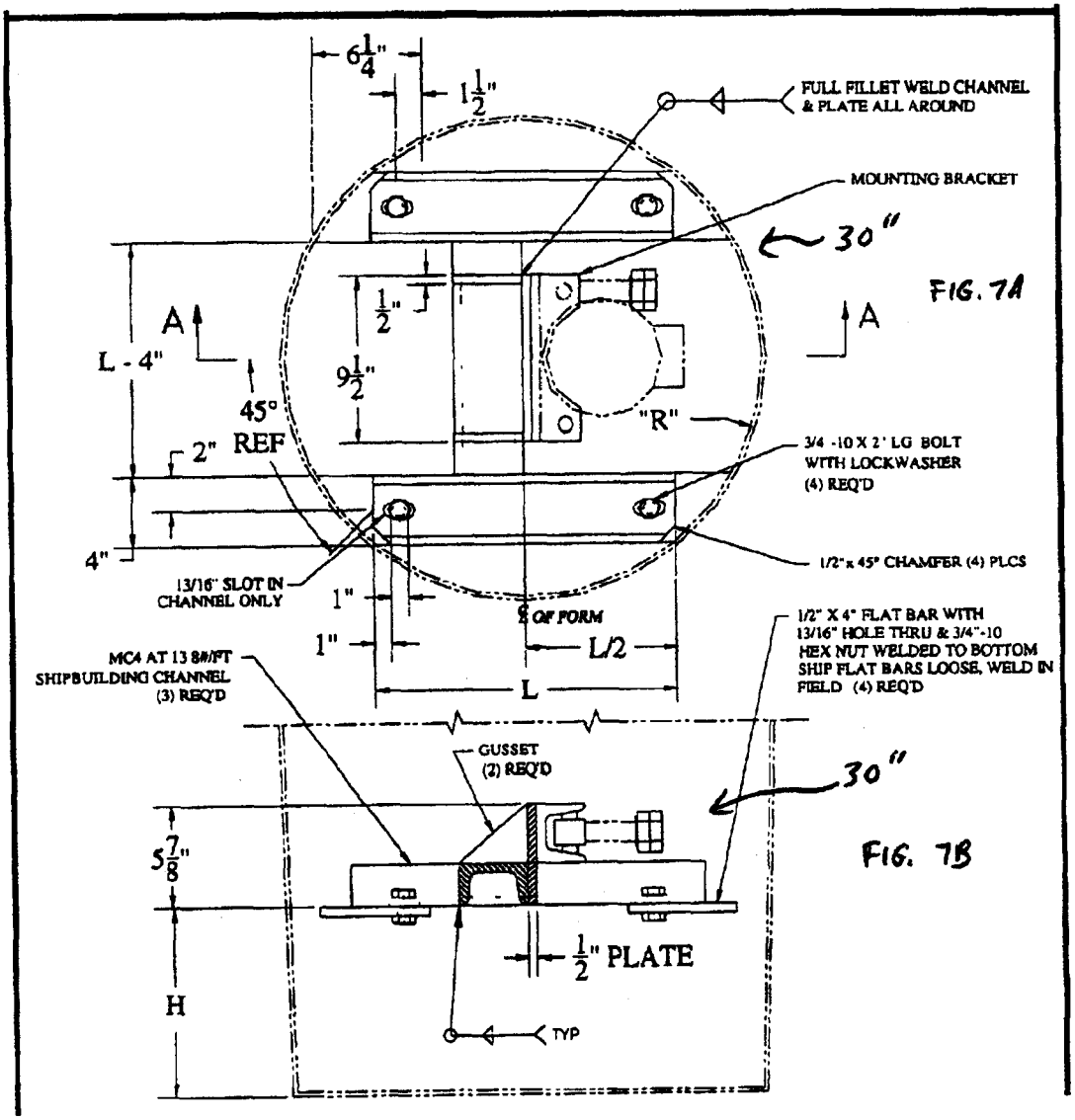

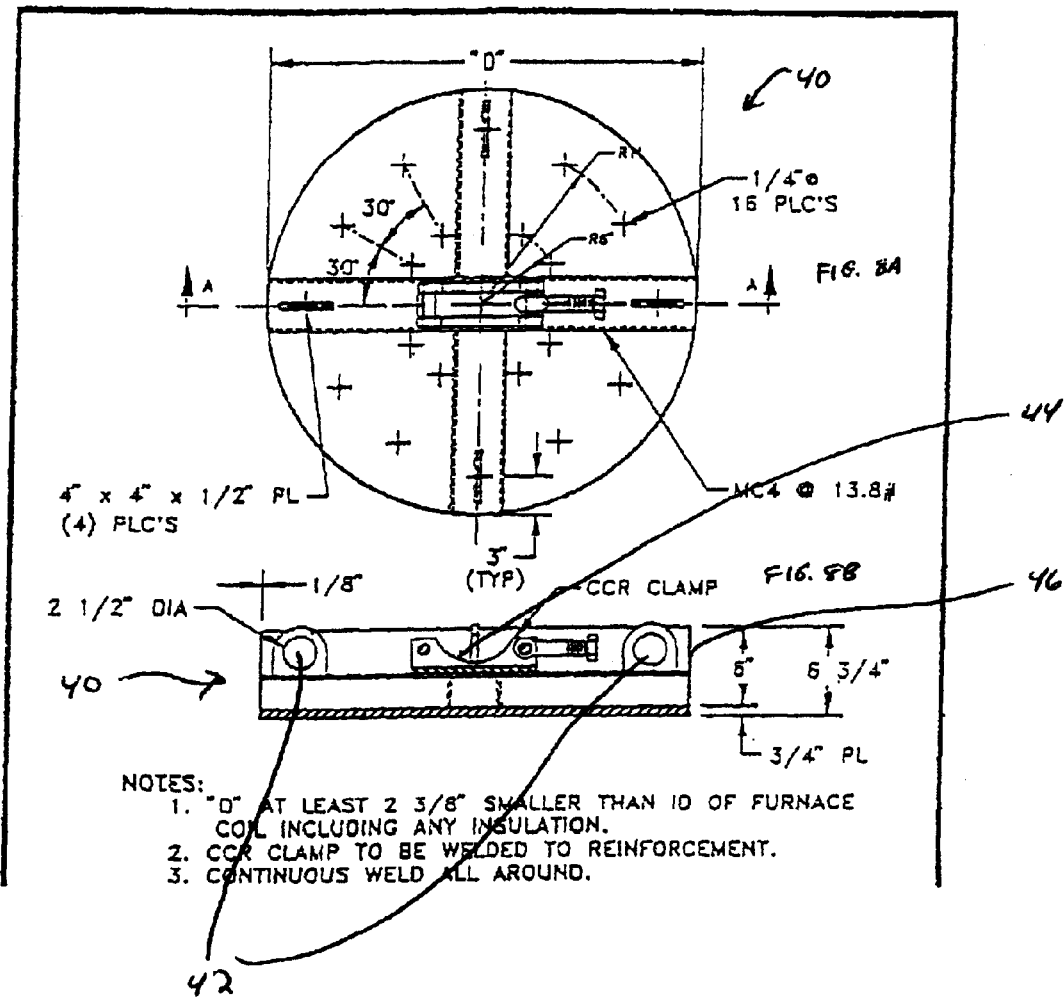

METHOD OF INSTALLING A REFRACTORY LINING

FIELD OF THE INVENTION

This invention relates to a method of installing a refractory lining in an electric induction furnace, such as a coreless or channel induction furnace, and particularly a method of installing a refractory lining in an electric induction furnace using an electric vibrator.

BACKGROUND OF THE INVENTION

Electric induction furnaces are used, for example, in the production of molten ferrous and nonferrous metals. These molten metals typically are used to produce castings in foundries from scrap. Induction melting is accomplished by applying an electric current to copper furnace coils, referred to as the primary winding. The current in the primary winding induces a current in the scrap metal within the furnace, referred to as the secondary winding. The current induced in the secondary winding meets electrical resistance and generates heat. When sufficient heat is generated, the scrap metal melts. Induction heating is used not only for melting metals but also for holding metals in the molten state until the metal is removed from the furnace for the production of castings or other processing Application temperatures typically range from about 1000 F. to about 3200 F.

To contain the heat and molten metal within an induction furnace, specialized refractory materials typically are used to line the furnace. Conventional refractory linings for induction furnaces typically are comprised of silica, fused alumina, fused magnesia, calcined magnesia, fused mullite, calcined fireclay, calcined chamotte, calcined bauxite, and zircon refractory aggregate. The refractory lining is a consumable material that is eroded or otherwise damaged by exposure to the conditions within the furnace. Conventional refractory lining materials tend to have a relatively high consumption rate, which corresponds to a short lining life.

When a certain amount of consumption or damage to the lining has occurred, the operation of the induction furnace must be interrupted to repair or replace the refractory lining. The frequency of the interruption is determined by the consumption rate of the refractory lining for a given process. The duration of an interruption depends on the nature and extent of the consumption. When the consumption or damage is extensive, removal and replacement of the entire refractory lining rather than repair of the eroded or damaged portion may be necessary. Replacement of the lining increases furnace downtime. The total furnace downtime depends on the frequency and duration of the interruptions.

The electric induction furnace may be a coreless or a channel furnace. A coreless furnace includes a generally continuous floor portion and walls that extend upwardly from the periphery of the floor portion. A channel furnace includes a floor/throat portion and walls that extend upwardly from the periphery of the floor portion. The floor/throat portion defines an outlet connected to an inductor. The inductor typically includes a metal container or casing that encloses a refractory lining and bushings. The bushings are hollow and typically are made of copper or steel. An induction assembly is enclosed within each bushing, which serves as the primary winding. The refractory lining defines a passageway for molten metal flowing from the outlet. The molten metal is heated further in the inductor.

Refractory linings for the floor portion and walls of electric induction furnaces typically are installed in a two step process. First, the refractory lining is installed in the floor portion of the furnace. Second, the walls of the refractory lining are installed using a liner form that is positioned on the installed floor. The liner form defines the inner wall of the refractory lining. The inner wall of the furnace defines the outer wall of the refractory lining. Channel furnaces require an additional step for installation of refractory lining in the inductor.

The liner form may be removable or consumable. Removable forms typically are used for refractories designed to have low-temperature, heat-set bonds. Removable forms also are desirable to prevent contamination from melting of a consumable form into the molten metal product. Consumable forms typically are used for higher temperature applications (i.e., greater than about 2000 F.) when the melted form can be used as part of the molten metal product. Consumable forms also are used when removal of a form would not be feasible after refractory installation, for example, in the inductor of a channel furnace.

A refractory lining typically is installed in an inductor casing using a solid or hollow loop or channel form and cylindrical or rectangular bushings. The channel form typically is burned or melted away during a heatup process after the refractory has been installed. The decomposition of the channel form leaves a passageway for molten metal inside the refractory cross-section. The refractory is installed into the inductor casing around the channel form and bushings. Generally, the refractory is placed into the bottom of the inductor casing. When a sufficient amount of refractory has been added to the bottom of the casing, the channel form is placed inside the inductor casing. Refractory is then added around the channel form. When a sufficient thickness of refractory has been added around the channel form, at least one bushing is installed. After installation of the bushing(s), refractory is continually installed between the channel form and the inductor casing and around the bushing(s) within the channel form to the top of the inductor casing.

Proper installation of the refractory is essential to prolonging refractory life. A successful installation is judged by the density of the installed refractory materials, i.e., the amount of material installed into an induction furnace for a given volume. Errors during installation that cause the installed refractory lining to have a less than optimal density will reduce the service life of the lining. Optimal density depends on the effective removal of air trapped within the dry refractory material and compaction of the dry refractory particles to reduce the distance between them. Air trapped within the dry refractory material typically is removed by inducing flow in loosely packed dry refractory material.

Refractory installation requires a skilled labor force and can be labor intensive. An installation can take from about three hours to three shifts or more, depending on the size of the furnace.

Conventional methods for installing a refractory lining require the provision of dry refractory material in loose shallow layers. The maximum depth of the layers is about 3–5 inches depending on the type of refractory. For example, silica refractory generally may be installed in layers having a maximum depth of about 5 inches, dry vibratable refractories (including alumina/magnesia/mullite refractories) generally may be installed in layers having a maximum depth of about 4 inches, and chrome-alumina refractories generally may be installed in layers having a maximum depth of about 3 inches. The density of the refractory lining will be reduced if the layers of dry refractory material exceed the maximum depth for that application because it is difficult to properly perform manual deairing of thicker layers.

Manual deairing involves inducing flow in the dry refractory material so that air trapped within the dry refractory material may escape. This typically is accomplished by forking or spading the entire surface of the layer about four times. The density of the installed refractory lining will be reduced if the dry refractory material is not thoroughly deaired. Operator error due to inattention, undue haste or inadequate training may compromise a successful installation. The forking or spading tool typically weighs about 15–20 pounds, which can result in operator fatigue, which also may compromise a successful installation.

Conventional methods of installing refractory linings also require compaction of the dry refractory material using an electric vibrating tamper or form vibration. An electric vibrating tamper typically is used for smaller furnaces. A tamper also may be used for the rapid installation of non-silica refractory materials in large furnaces (i.e., those with a metal capacity of greater than about 8 tons) because form vibration generally cannot be used effectively and quickly in these applications.

As described above, a shallow layer of dry refractory material is provided in the bottom of the furnace or between a liner form and an inner wall of the furnace and the dry refractory material is manually deaired with a forking or spade tool before being compacted with the tamper. Each layer must be compacted before the next layer of loose refractory material is added. The process is repeated until the refractory lining floor or wall reaches a desired height. An installation typically will involve compaction of numerous layers.

The electric vibrating tamper, such as a Bosch vibrator, is provided with a vibrating foot, with a disk-shaped foot being used for floor installation and a crescent shaped foot being used for wall installation. The electric vibrating tamper is controlled manually by the operator. The amount of force available for compacting the refractory material with an electric vibrating tamper depends upon the centrifugal force produced and the pressure applied by the operator. When operated using a 240-volt power source, rotation of the centrifugal weight of the tamper at 3600 rpm will produce a force of approximately 450 lbs.

Installation of refractory linings using an electric vibrating tamper can be time consuming, ranging from about 3 to 24 hours depending on furnace size. The operator must be skilled and attentive to the installation to avoid premature failure of the refractory lining due to inadequate densification or insufficient knitting of the various refractory layers. This is especially true in the case of channel inductors because of the difficulty in compacting the refractory underneath the channel form and between the channel form and the bushing(s) given the enclosed spaces and the sizes of the deairing tool and vibrating tamper.

Form vibration is most commonly used to install refractory linings in larger furnaces. Form vibration generally is less labor intensive than an electric vibrating tamper because, while the refractory material still must be installed in layers having a maximum depth of about 3–5 inches, with manual deairing of each layer before the addition of a subsequent layer, compaction of the dry refractory material can be carried out in a single operation after all of the dry refractory layers have been added to the liner form. The liner form is backfilled with additional dry refractory material after an initial period of form vibration and then vibration is continued.

Form vibrators typically are powered by compressed air. The availability of a compressed air supply or sufficient quantity and quality is a major disadvantage to the use for form vibrators. Some foundries have difficulty in providing adequate compressed air pressure (80 psi minimum) due to the demands for compressed air by other operations within the foundry. Other foundries have difficulty in providing adequate compressed air volume to the constrictions in air lines. The lack of adequate compressed air pressure or volume may require that the furnace be relined during off-peak hours when air is more readily available. Other foundries have difficulty in providing compressed air of suitable quality. Dirty or wet compressed air will wear the moving components of the vibrator, which comprises vibrator output and result in a less dense refractory lining. This in turn results in a shorter refractory life, causing more frequent relines, increased furnace downtime, and increased operating cost.

Form vibrators may use frequency vibration or impact vibration. Form vibrators that use frequency vibration are generally preferred because the frequency can be measured during operation, e.g., using a Vibra-Tak vibration indicator. The frequency measurement allows the operator to determine if the vibrator is operating properly and to calculate the approximate vibrational force being applied. Conventional form vibrators that use frequency vibration may be low amplitude, high frequency vibrators or high amplitude, low frequency vibrators. Low frequency, high amplitude vibrators, such as the Martin BRUTE, typically operate between about 2500 and 4000 rpm. The high amplitude vibration is particularly effective for inducing dry material to flow. Use of low frequency, high amplitude vibrators is limited to lower density refractories (e.g., densities in the range of 130 lb./ft$^3$). High amplitude vibrators also are generally not suitable for use in small furnaces due to the high force exerted by the vibrator during use. Multiple vibrator locations, typically eight to twelve locations depending on furnace size) are required for effective installation.

High frequency, low amplitude (mass) vibrators, such as the Martin VIBROTOR, typically operate between about 4800 and 6500 rpm. The low amplitude vibration is particularly effective for compacting the dry refractory material. The use of high frequency, low amplitude vibrators has been found to be effective using multiple refractory systems in the 130–200 lb./ft$^3$ density ranges. The number of vibrator locations typically is lower than for low frequency, high amplitude vibrators.

Conventional vibrators typically are used by bolting the vibrator to an iron frame that has been welded to the interior of the form or the furnace structure. Other methods for causing the vibrator to engage the form also may be used. For example, in the expanding Netter-Cross vibrator, a hydraulic pump forces oak runners out into contact with the form and then a pneumatic vibrator shakes the form to compact the dry refractory material.

Form vibrators that use impact vibration have numerous pistons that strike the inside of the form. One commonly used impact vibrator has three pneumatically powered whipping hammers or jackhammers extending radially from a cylinder, which is suspended from a crane over the liner form The cylinder rotates on a carousel relative to the form such that the hammers can engage the entire circumference of a generally circular liner form.

Impact vibrators have several disadvantages. Because impact vibrators are not harmonic vibrators, the vibration frequency cannot be measured in the field, so it is difficult for an operator to determine if the vibrator is operating properly and sufficient compaction has been achieved. The vibrator must be moved to multiple locations within the liner form to ensure that the vibrator has effectively impacted the entire volume of the form. A skilled, experienced operator is needed to determine the locations where the vibrator is to be positioned. The intense forces associated with impact vibration also tend to limit the service life of the vibrator. For example, the three-hammer vibrator described above tends to have a service life of about one year compared to about 3–5 years for harmonic form vibrators.

It is an object of the invention to provide a method of installing a refractory lining for an electric induction furnace that avoids the need to add dry refractory to the lining walls in layers with manual deairing of each layer before addition of the next layer.

It also is an object of the invention to provide a method of rapidly installing a refractory lining for an electric induction furnace that reduces downtime and operator error during installation and replacement of the lining.

It is another object of the invention to provide a method of rapidly installing a more consistent refractory lining for an electric induction furnace using a variable frequency/amplitude electric vibrator.

It is still another object of the invention to provide a method of installing a refractory lining that avoids the disadvantages associated with conventional installation methods using vibrators powered by compressed air.

It is yet another object of the invention to provide a method of rapidly installing nonsilica refractory linings in large furnaces (i.e., those having a metal capacity of greater than about 8 tons) without using an electric vibrating tamper.

It is yet another object of the invention to provide a method of rapidly installing silica and nonsilica refractory linings in channel inductors without using an electric vibrating tamper or manually deairing the refractory.

These and other objects of the present invention will be apparent from the specification that follows, the appended claims, and the drawings.

SUMMARY OF THE INVENTION

The present invention overcomes the problems associated with conventional refractory lining methods. The method uses a variable frequency/amplitude electric vibrator. The electric vibrator provides a precise output, which results in a repeatable process that is not dependent on adequate air pressure or quality or operator skill. The repeatability of the process results in more consistent lining installations, which corresponds to longer lining service life. The method allows elimination of the layering of the dry refractory material in the walls and the manual deairing of each layer. This reduces furnace downtime and labor costs associated with installation and replacement of refractory linings.

The present invention provides a method of installing a refractory lining in a wall of an electric induction furnace, the method comprising the steps of providing a dry refractory material between a liner form placed within the furnace and a furnace wall, placing at least one variable frequency/amplitude electric vibrator in operational communication with an element selected from a structural member of the furnace, the liner form, and a vibrator rig placed within the furnace, inducing flow of the dry refractory material by operating at least one variable frequency/amplitude vibrator in a first operational mode having a high amplitude, low frequency vibration, and compacting the dry refractory material by operating at least one variable frequency/amplitude vibrator in a second operational mode having low amplitude, high frequency vibration after inducing flow of the dry refractory material. The method also may include the step of providing additional dry refractory material between the liner form and the furnace wall before compacting the dry refractory material.

Preferably, the variable frequency/amplitude vibrator has a rotating shaft. The method may include the steps of causing the shaft to rotate in a first rotational direction in the first operational mode and in a second rotational direction in the second operational mode and selecting a shaft rotational axis to maximize refractory densification.

The method also may include the steps of providing a programmable controller in operational communication with at least one variable frequency/amplitude vibrator, the controller being capable of storing and sending instructions for direction of vibrator shaft rotation, vibrator speed, and time of vibrator operation and storing instructions for preselected operational modes, with each operational mode defining a direction of vibrator shaft rotation, vibrator speed, and time of vibrator operation. The method may further include the step of causing the programmable controller to store instructions for at least one preselected operational mode. In another embodiment of the invention, the method of installing a refractory lining in a wall of an electric induction furnace may include the steps of providing a dry refractory material between a liner form placed within the furnace and a furnace wall, placing at least one variable frequency/amplitude electric vibrator in operational communication with an element selected from a structural member of the furnace, the liner form, and a vibrator rig placed within the furnace, operating at least one variable frequency/amplitude vibrator in a first operational mode having a high amplitude, low frequency vibration such that flow of the dry refractory material is induced and the volume of the dry refractory material is reduced, and operating at least one variable frequency/amplitude vibrator in a second operational mode having a low amplitude, high frequency vibration such that compaction of the dry refractory material occurs after flow of the dry refractory material is induced. The method further may include the step of providing additional dry refractory material between the liner form and the furnace wall before compacting the dry refractory material.

In still another embodiment of the invention, the method of installing a refractory lining in a wall of an electric induction furnace consists essentially of the steps of providing a dry refractory material between a liner form placed within the furnace and a furnace wall, placing at least one variable frequency/amplitude electric vibrator in operational communication with an element selected from a structural member of the furnace, the liner form, and a vibrator rig placed within the furnace, inducing flow of the dry refractory material by operating at least one variable frequency/amplitude vibrator in a first operational mode having a high amplitude, low frequency vibration, and compacting the dry refractory material by operating at least one variable frequency/amplitude vibrator in a second operational mode having a low amplitude, high frequency vibration after inducing flow of the dry refractory material.

In yet another embodiment of the invention, the method of installing a refractory lining in a wall of an electric induction furnace may include the steps of providing a dry refractory material between a liner form placed within the furnace and a furnace wall, placing at least one variable frequency/amplitude electric vibrator having a rotating shaft in operational communication with an element selected from a structural member of the furnace, the liner form, and a vibrator rig placed within the furnace, inducing flow of the dry refractory material by operating at least one variable frequency/amplitude vibrator in a first operational mode having a low frequency vibration and a first shaft rotational direction, and compacting the dry refractory material by operating at least one variable frequency/amplitude vibrator in a second operational mode after inducing flow of the dry refractory material, the second operational mode having a high frequency vibration and a second shaft rotational direction, the said first shaft rotational direction causing the vibrator to vibrate at high amplitude and the second shaft rotational direction causing the vibrator to operate at low amplitude. The method further may include the step of adding additional dry refractory material between the liner form and the furnace wall after the volume of the dry refractory material has been reduced. The method also may include the step of selecting a shaft rotational axis to maximize refractory densification.

The method also may include the steps of providing a programmable controller in operational communication with at least one variable frequency/amplitude vibrator, the controller being capable of storing and sending instructions for direction of vibrator shaft rotation, vibrator speed, and time of vibrator operation and storing instructions for preselected operational modes, each operational mode defining a direction of vibrator shaft rotation, vibrator speed, and time of vibrator operation. The method may further include the step of causing the programmable controller to store instructions for at least one preselected operational mode.

In another embodiment of the invention, a method of installing a refractory lining in a wall of an electric induction furnace includes the steps of providing a first quantity of a dry refractory material between a liner form placed within the furnace and the furnace wall, placing at least one variable frequency/amplitude electric vibrator having a rotating shaft in operational communication with an element selected from a structural member of the furnace, the liner form, and a vibrator rig placed within the furnace, inducing flow of the dry refractory material by operating at least one variable frequency/amplitude vibrator in a first operational mode having a high amplitude, low frequency vibration in the first operational mode, compacting the dry refractory material by operating at least one variable frequency/amplitude vibrator in a second operational mode having a low amplitude, high frequency vibration after inducing flow of the dry refractory material, and providing a programmable controller in operational communication with at least one variable frequency/amplitude vibrator, the controller being capable of storing and sending instructions for direction of vibrator shaft rotation, vibrator speed, and time of vibrator operation, a first direction of vibrator shaft rotation causing operation of the vibrator at high amplitude and a second direction of vibrator shaft rotation causing operation of the vibrator at low amplitude. The programmable controller may be capable of storing instructions for preselected operational modes, each operational mode defining a direction of vibrator shaft rotation, vibrator speed, and time of vibrator operation, and the method may further include the step of causing the programmable controller to store instructions for at least one preselected operational mode.

The present invention also includes a method of installing a refractory lining in the floor portion of an electric induction furnace, the method including the steps of providing a dry refractory material in the floor portion of the furnace, providing at least one variable frequency/amplitude electric vibrator equipped with a vibrating bottom plate, and compacting the dry refractory material by causing the vibrating bottom plate to engage the dry refectory material when the attached variable frequency/amplitude vibrator is in an operational mode having a low amplitude, high frequency vibration after inducing flow of the dry refractory material. The method may further include the step of inducing flow of the dry refractory material before the compacting step by causing the vibrating bottom plate to engage the dry refractory material when the variable frequency/ amplitude vibrator is in an operational mode having a high amplitude, low frequency vibration. The method also may include the step of preparing the installed refractory lining floor portion for wall installation by scratching the surface of the periphery of the floor portion.

In the above-described floor installation method, at least one variable frequency/ amplitude vibrator may have a rotating shaft and the method may further include the step of causing the shaft to rotate in a first rotational direction in the first operational mode and in a second rotational direction in the second operational mode. The method also may include the step of providing a programmable controller in operational communication with at least one variable frequency/amplitude vibrator, the controller being capable of storing and sending instructions for direction of vibrator shaft rotation, vibrator speed, and time of vibrator operation and storing instructions for preselected operational modes, with each operational mode defining a direction of vibrator shaft rotation, vibrator speed, and time of vibrator operation. The method further may include the step of causing the programmable controller to store instructions for at least one preselected operational mode.

The invention also provides a method of installing a refractory lining in an electric induction furnace, including the steps of installing a refractory lining in the floor portion of the furnace, providing a dry refractory material between a liner form placed on the floor portion of the refractory lining and the furnace wall, placing at least one variable frequency/amplitude electric vibrator in operational communication with an element selected from a structural member of the furnace, the liner form, and a vibrator rig placed within the furnace, inducing flow of the dry refractory material by operating at least one variable frequency/ amplitude vibrator in a first operational mode having a high amplitude, low frequency vibration, and compacting the dry refractory material by operating at least one variable frequency/amplitude vibrator in a second operational mode having a low amplitude, high frequency vibration after inducing flow of the dry refractory material. The method may further include the step of adding additional dry refractory material between the liner form and the furnace wall before compacting the dry refractory material.

In the above described method, at least one variable frequency/amplitude vibrator may have a rotating shaft and the method may comprise the steps of causing the shaft to rotate in a first rotational direction in the first operational mode and in a second rotational direction in the second operational mode and selecting a shaft rotational axis to maximize refractory densification.

The method also may include the step of providing a programmable controller in operational communication with at least one variable frequency/amplitude vibrator, the controller being capable of storing and sending instructions for direction of vibrator shaft rotation, vibrator speed, and time of vibrator operation and storing instructions for preselected operational modes, each operational mode defining a direction of vibrator shaft rotation, vibrator speed, and time of vibrator operation. The method further may comprise the step of causing the programmable controller to store instructions for at least one preselected operational mode.

In the above-described method, the step of installing a refractory lining in the floor portion of the furnace may comprise the steps of providing a dry refractory material in the floor portion of the furnace, attaching a vibrating bottom plate to at least one variable frequency/amplitude electric vibrator, and compacting the dry refractory material in the furnace floor portion by causing at least one vibrating bottom plate to engage the dry refectory material in the furnace floor portion when the attached variable frequency/amplitude vibrator is in an operational mode having a low amplitude, high frequency vibration. The floor installing step may further include the step of inducing flow of the dry refractory material in the furnace floor portion before the compacting step by causing at least one vibrating bottom plate to engage the dry refectory material in the furnace floor portion when the attached variable frequency/amplitude vibrator in an operational mode having a high amplitude, low frequency vibration. The floor installing also may include the step of preparing the installed refractory lining floor portion for wall installation by scratching the periphery of the surface of the floor portion.

The invention also includes a method of installing a refractory lining in an inductor of an electric channel induction furnace, including the steps of placing a channel form inside an inductor casing, installing at least one bushing spaced at a distance from the interior of the channel form, filling the inductor with dry refractory material, placing at least one variable frequency/amplitude electric vibrator in operational communication with an element selected from the inductor casing and the channel form, inducing flow of the dry refractory material by operating at least one variable frequency/ amplitude vibrator in a first operational mode having a high amplitude, low frequency vibration, and compacting the dry refractory material by operating at least one variable frequency/amplitude vibrator in a second operational mode having low amplitude, high frequency vibration after inducing flow of the dry refractory material.

In another preferred embodiment of the invention, a method of installing a refractory lining in a wall of an electric induction furnace includes the steps of providing a dry refractory material between a liner form placed within the furnace and a furnace wall, placing at least one electric vibrator in operational communication with an element selected from a structural member of the furnace, the liner form, and a vibrator rig placed within the furnace, inducing flow of the dry refractory material by operating at least one electric vibrator in a first operational mode having a high amplitude, low frequency vibration, and compacting the dry refractory material by operating at least one electric vibrator in a second operational mode having low amplitude, high frequency vibration after inducing flow of the dry refractory material.

Additional features and advantages of various preferred embodiments of the invention will be better understood in view of the detailed description provided below.

BRIEF DESCRIPTION OF THE DRAWINGS

FIG. 4 is a partial view of the variable frequency/amplitude electric vibrator of FIG. 1 with an endcap removed, showing the position of the eccentric weights during operation in a first operational mode.

FIG. 5 is a partial view of the variable frequency/amplitude electric vibrator of FIG. 1 with an endcap removed, showing the position of the eccentric weights during operation in a second operational mode.

FIGS. 7A and B are schematic diagrams of a vibrator rig for a coreless electric induction furnace having a capacity of 5 tons or less.

FIGS. 8A and B are schematic diagrams of a bottom vibrating plate for use in installing a refractory bottom lining using the variable frequency/amplitude electric vibrator of FIG. 1.

DETAILED DESCRIPTION OF THE PREFERRED EMBODIMENTS(S)

Figure 11:
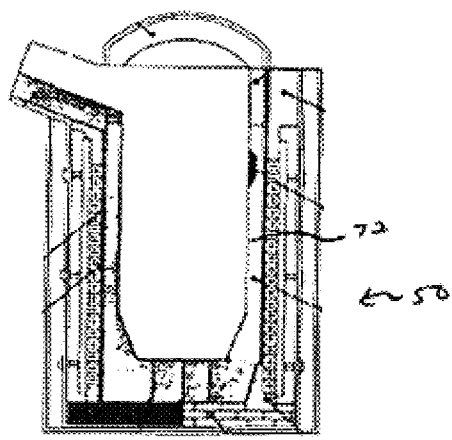
FIG. 11 is a schematic side elevational view of a coreless electric induction furnace.
Figure 12:
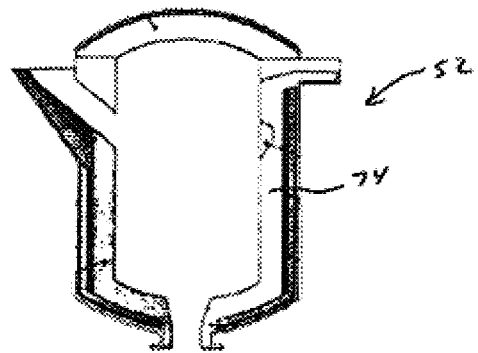
FIG. 12 is a schematic side elevational view of the body of a channel electric induction furnace.

The vibrator of the present invention provides a method of installing dry refractory material in an electric induction furnace to form a refractory lining therein. The method may be used in coreless electric induction furnaces 50 of the type shown in FIG. 11 and in channel electric induction furnaces 50 of the type shown in FIG. 12 The method offers particular advantages during the installation of the walls of the refractory lining but also may be used to install the floor portion of the refractory lining.

For simplicity, the present method generally is described with reference to use of a single vibrator. The method also may be practiced using more than one vibrator.

Figure 1:
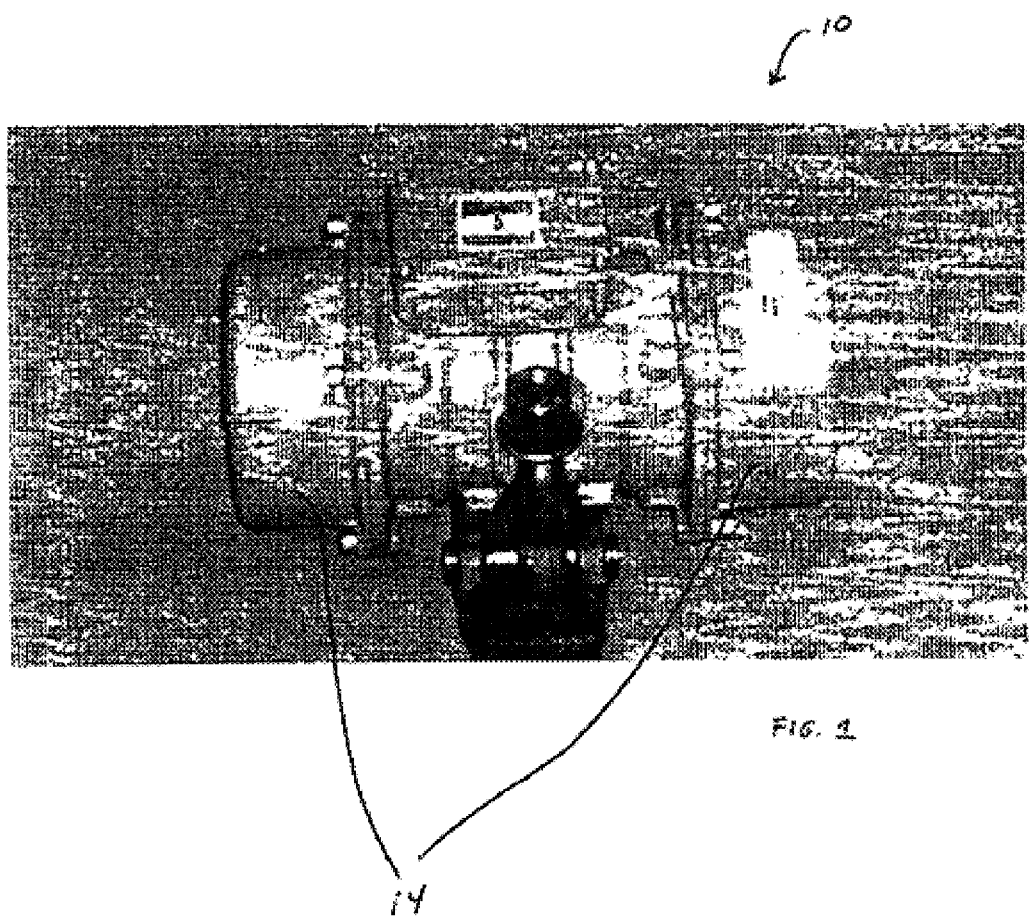
FIG. 1 is a variable frequency/amplitude electric vibrator useful in the practice of the present invention.
Figure 2:
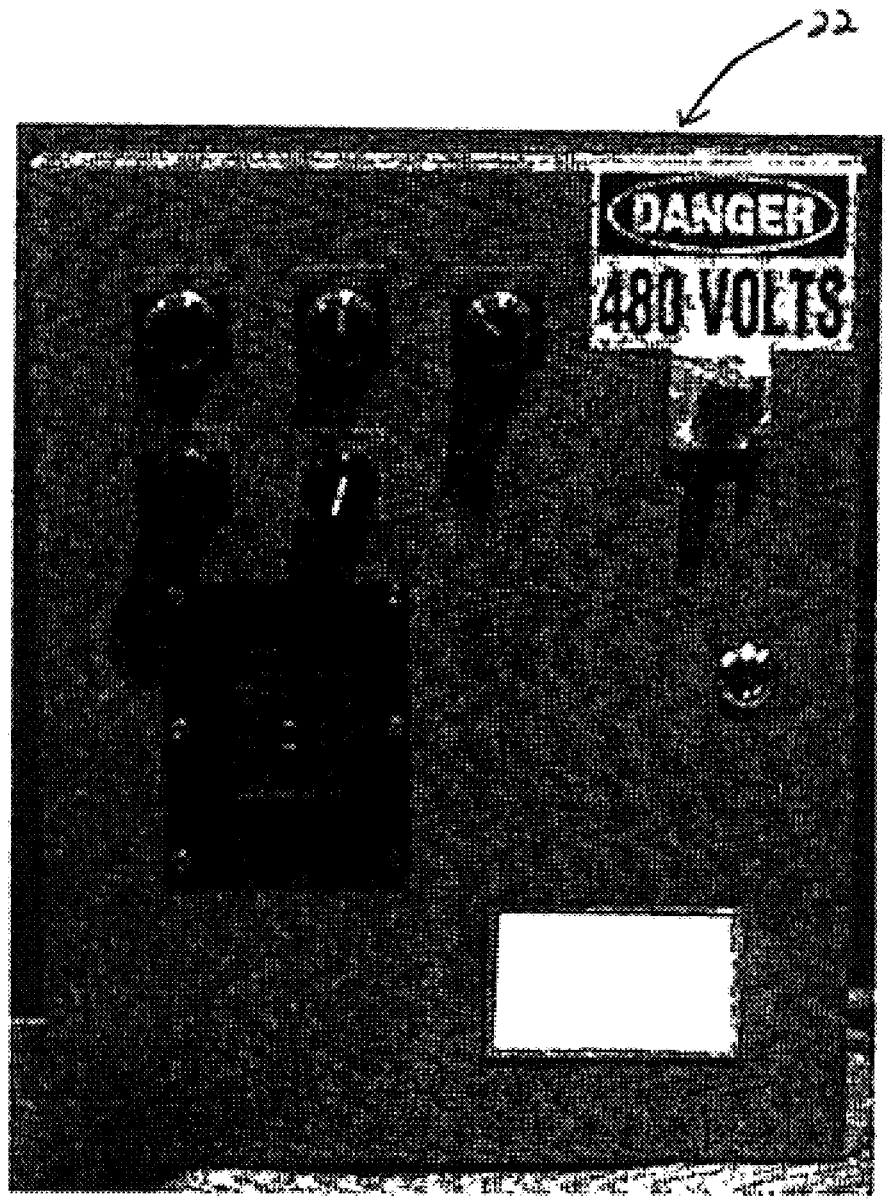
FIG. 2 is the front panel of a programmable controller useful in the practice of the present invention.

The walls of the refractory lining may be installed by providing dry refractory material between a liner form positioned on an installed floor portion and an inner wall of the furnace. The dry refractory material may be added using a conventional funnel. A variable frequency/amplitude electric vibrator 10, shown in FIG. 1, is placed in operational communication with a structural member of the furnace, the liner form, a vibrator rig placed within the furnace, or a combination of these such that the vibration is effectively transmitted to the dry refractory material. The variable frequency/amplitude vibrator 10 in communication with one or more of these elements induces flow of the dry refractory material and compacts the dry refractory material to form a dense mass. This may be accomplished by causing the variable frequency/amplitude vibrator 10 to contact a refractory supporting structure in first and second operational modes characterized by different vibration frequencies and amplitudes.

In the first operational mode, the vibration of the vibrator has a high amplitude and a low frequency and in the second operational mode the vibration of the vibrator has a low amplitude and a high frequency. The combination of high amplitude and low frequency vibration induces the flow of the dry refractory material, which releases air trapped within the dry refractory material. The combination of low amplitude and high frequency vibration compacts the dry refractory particles to form a dense mass. The variable frequency of the vibrator promotes densification by providing effective deairing and compaction. Additional refractory may be added before beginning the compaction step to fill the void remaining in the wall area after deairing.

The amplitude, frequency and time of vibration can be controlled though the use of a variable frequency drive. The drive can be manually operated but preferably is programmed to operate the vibrator with a given amplitude and frequency for at specified time. For example, the vibrator may be set to operate for a first cycle with higher amplitude, lower frequency for deairing of the dry refractory material. As described further below, the amplitude of the variable frequency/amplitude vibrator having a rotating shaft may be controlled by providing the vibrator with a slip weight system and changing the direction of shaft rotation to engage the preferred weight.

The floor portion of a refractory lining may be installed using conventional methods such as a Bosch vibrator or by adding a vibrating bottom plate 40 (shown in FIGS. 8A and B) to the electric form vibrator. For a typical floor portion having a lining depth of about 15 inches, the dry refractory material preferably would be installed in at least three layers. The dry refractory materials would be placed in the bottom of the liner form to a depth of about 3–5 inches and the layer would be manually deaired using a conventional forking tool or spading tool. The deaired bottom layer would be vibrated using either a conventional electric vibrating tamper or an electric form vibrator 10 with the vibrating bottom 40 plate attached. The plate preferably is fabricated using ¾-inch thick steel plate and includes lifting hooks 42 and a vibrator mount 44 as shown in FIGS. 8A and B. A skirt 46 measuring about ⅛-inch thick by about 6 inches high preferably is welded to the outside of the plate. When the vibration of the refractory had been carried our for an appropriate time, the next layer of dry refractory and the process is repeated until the desired depth of the lining bottom has been achieved.

A variable frequency/amplitude electric vibrator useful in the practice of the present invention is shown in FIG. 1. Preferably, the electric vibrator is a continuous duty, three phase, 60-cycle unit capable of operating within a range of either 220–240 volts or 380–480 volts depending on the electrical service available in the vicinity of the furnace. Preferably, the vibrator also can operate at 50 cycles with the use of the control panel. The vibrator may be characterized by a vibration range of about 0–6000 vibrations per minute (vpm).

The amplitude of vibration of the electric vibrator 10 may be varied through the use of eccentric slip weights 12 that can be adjusted to obtain different degrees of imbalance for a given operating frequency. The weights are referred to as slip weights 12 because they shift based on a change in the direction of rotation. Because the weights 12 self-adjust to change the amplitude when the direction of rotation is changed, manual adjustment of the weights 12 is not necessary to change amplitude. This avoids the need to remove the vibrator 10 from a vibrator rig within the liner form or furnace mount between the deairing and compaction steps.

Figure 3:
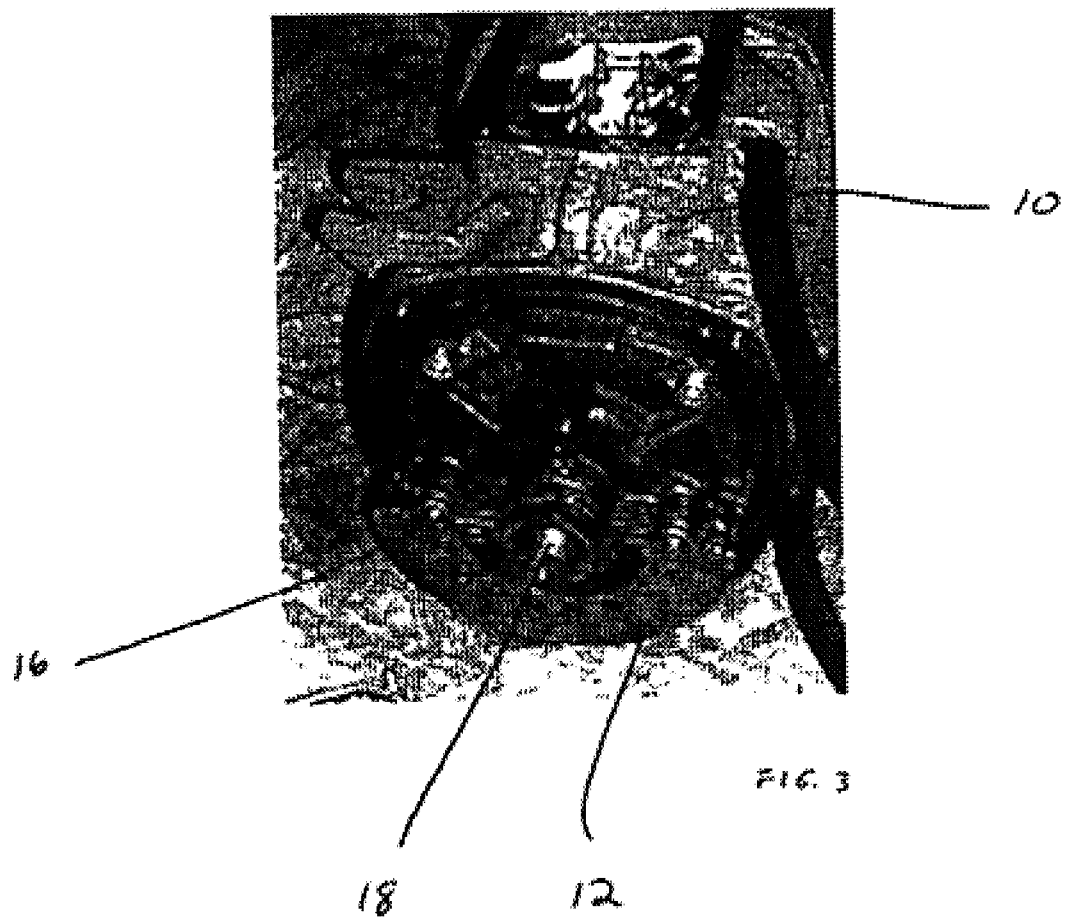
FIG. 3 is a partial view of the variable frequency/amplitude electric vibrator of FIG. 1 with an endcap removed to show the eccentric weights used to vary the vibration amplitude and the location for checking the initial direction of shaft rotation.

The slip weights 12 may be housed in an end cap 14 provided on each end of the vibrator 10. Preferably, each set of weights 12 includes five plates 16 that engage the rotating shaft 18. In the first operational mode, the shaft 18 may rotate in a first or clockwise rotational direction with the plates 16 arranged in a generally stacked position, shown in FIG. 4. The unbalanced distribution of the weights 12 in engagement with the rotating shaft 18 results in a higher amplitude of vibration, which may be characterized by a generally rocking motion when the vibrator 10 is operated at low frequencies This motion induces flow of the dry refractory material, which in turn promotes the removal of air trapped within the dry refractory material. In the second operational mode, the shaft 18 may rotate in a second or counterclockwise rotational direction. The two outermost weights 16A slip on a pin 20, moving to a position generally opposed to the three innermost weights 16B, in response to the change in the direction of the shaft rotation, shown in FIG. 5. The opposing weight positions result in a more balanced weight distribution. The more balanced distribution of weights 12 in engagement with the rotating shaft 18 results in a low amplitude of vibration that allows operation of the vibrator at a higher frequency. The lower amplitude, higher frequency vibration is particularly effective in compacting deaired dry refractory material. The initial direction of shaft rotation should be checked by removing an endcap as shown in FIG. 3. The vibrator should be set so that the shaft rotates in a clockwise direction when the plates are in the stacked position.

The vibrator preferably includes a variable frequency drive. The variable frequency drive may use a conventional frequency inverter to vary the frequency of the vibrator. The vibration frequency may be selected to obtain optimal densification for a particular dry refractory material. A conventional Vibra-Tak vibration indicator may be used to monitor the vibration rate of the electric vibrator.

Preferably, the variable frequency drive is provided within a control unit or controller that includes a control panel 22 and related circuitry. The control panel may include control devices including but not limited to buttons, switches, and keypads, and displays of operating status or conditions. Preferably, a single control panel is capable of controlling a plurality of vibrators, although a separate control panel can be used for each of a plurality of vibrators if desired.

Preferably, the controller is programmable such that the vibrator may be operated in either a manual or an automatic mode. A switch may be provided on the control panel 22 for selecting between manual and automatic modes. In the manual mode, a switch may be used to select the direction of the shaft rotation and a potentiometer or other suitable control device may be used to select the motor frequency. A stop button also is provided on the control panel.

The program variables typically are time of operation, speed of operation, and direction of shaft rotation. When the automatic mode is selected, the vibrator may be programmed to run in a first rotational direction for a first time period at a first speed and then switch automatically to run in a second rotational direction for a second time period at a second speed. For example, the amp range of a vibrator nominally is about 3.8 at 230 volts and about 1.9 at 460 volts and the rated motor horsepower is 1.43. In a first operational mode with the shaft rotating in a first rotational direction, a high weight setting for maximum amplitude of about 7.95 in-lb. results in a force of 2924 lbs. at 3600 vpm. In a second operational mode with the shaft rotating in a second rotational direction, a low weight setting for lower amplitude is about 2.07 in-lb. results in a force of 2112 lbs. at 6000 vpm.

The programmability of the controller reduces operator input and results in more consistent refractory installation, which in turn tends to result in longer refractory life. The operator need only attach the vibrator to a vibrator rig within the liner form or furnace structure, add dry refractory material between the liner form and the inner walls of the furnace, and press the start button on the control panel to begin installation. This reduces the need for operator skill and training and minimizes operator error.

The programmability of the controller also reduces furnace downtime because the high amplitude, low frequency vibration of the first operational mode is effective in inducing flow of the dry refractory material. This allows elimination of both the addition of the refractory material in layers and manual deairing. The elimination of the layering and manual deairing steps may reduce downtime by about 10 hours for a large furnace rebuild.

Figure 6A:
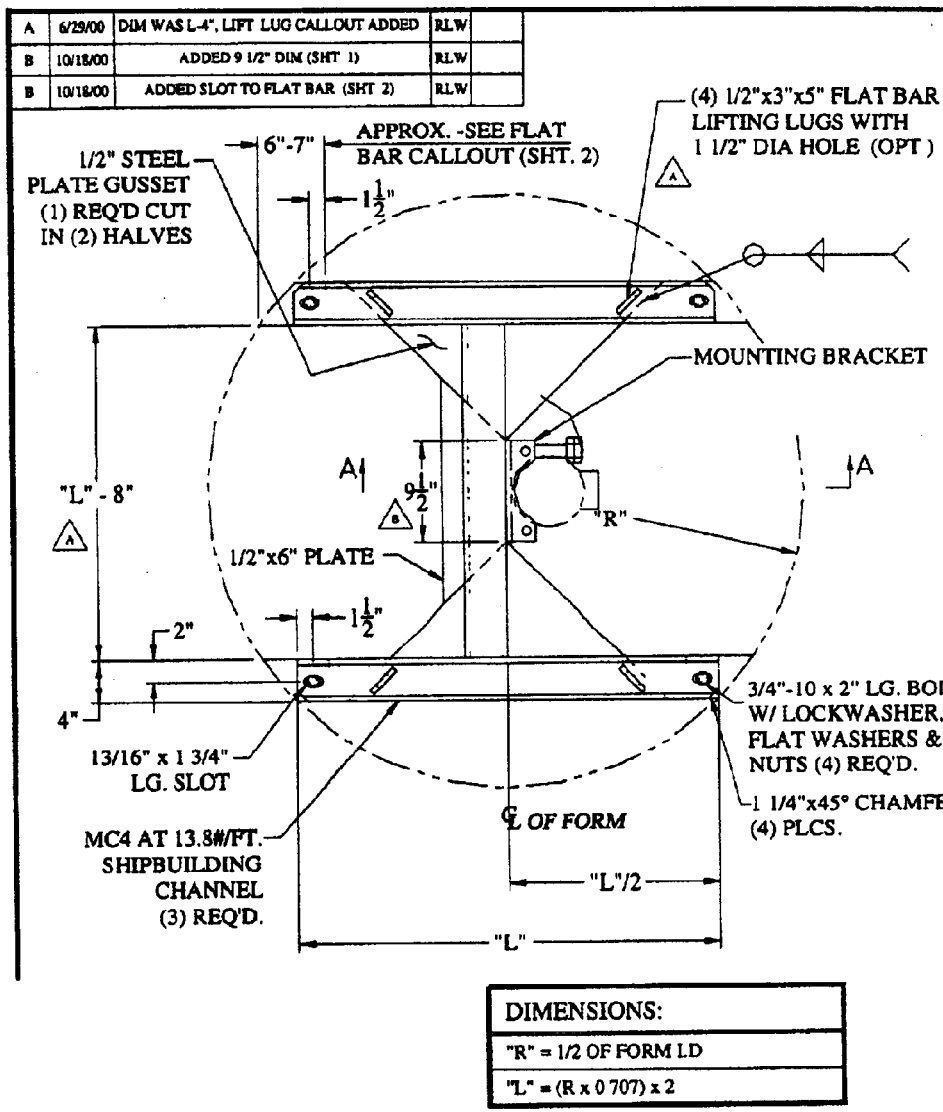
FIGS. 6A and B are schematic diagrams of a vibrator rig for a coreless electric induction furnace having a capacity larger than 5 tons.
Figure 6B:
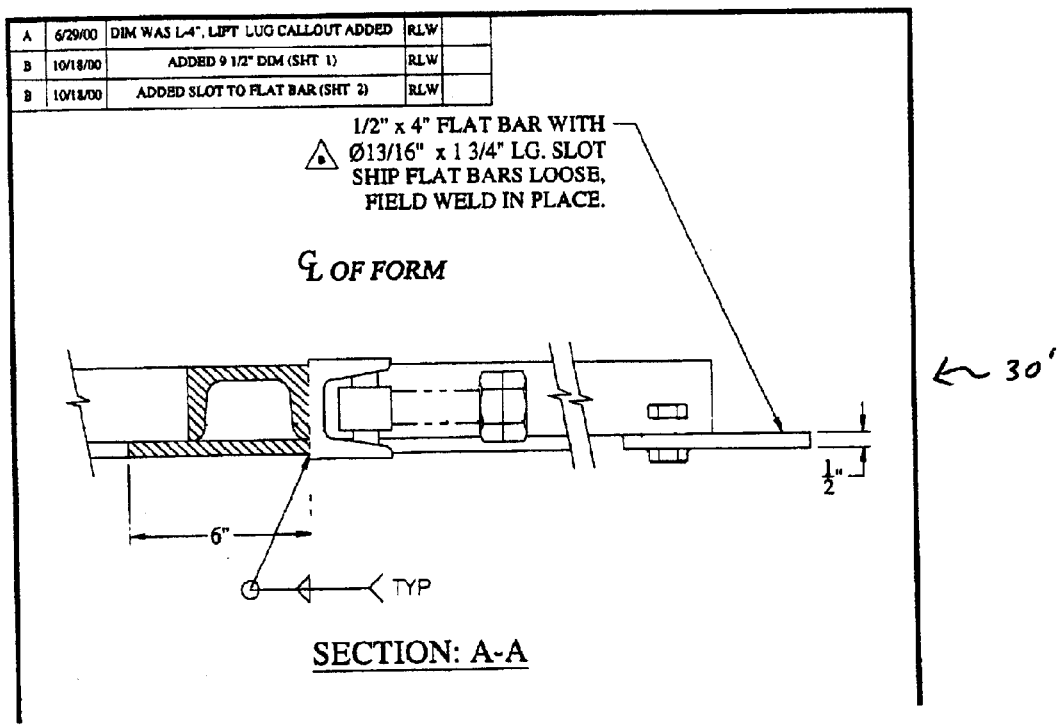
Figure 9:
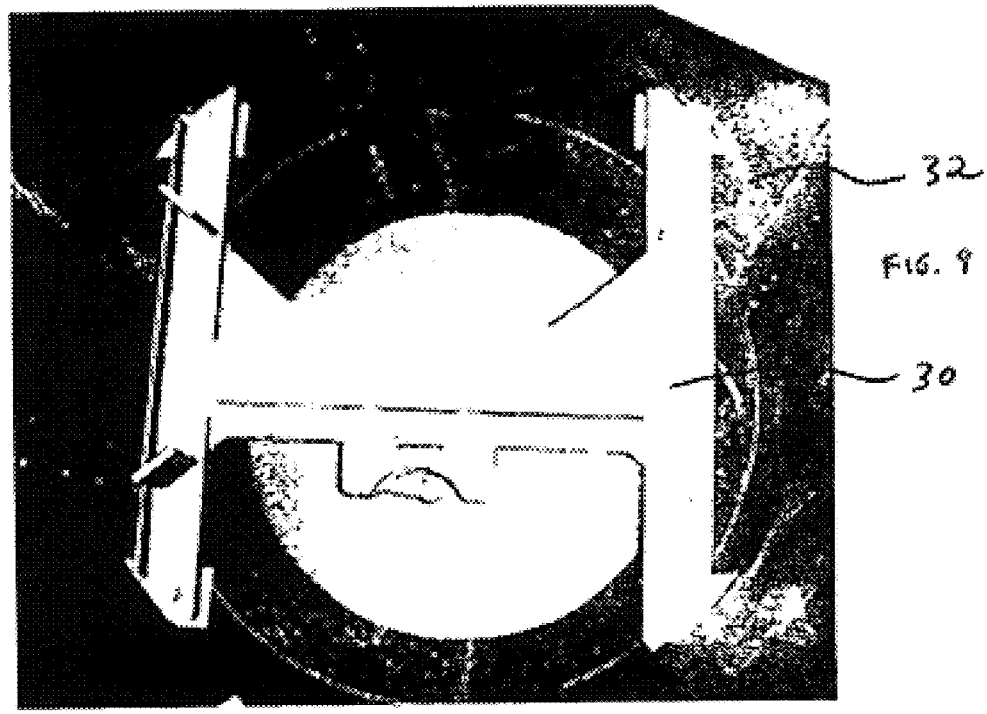
FIG. 9 is a top elevation view of a vibrator rig installed within a coreless electric induction furnace.
Figure 10:
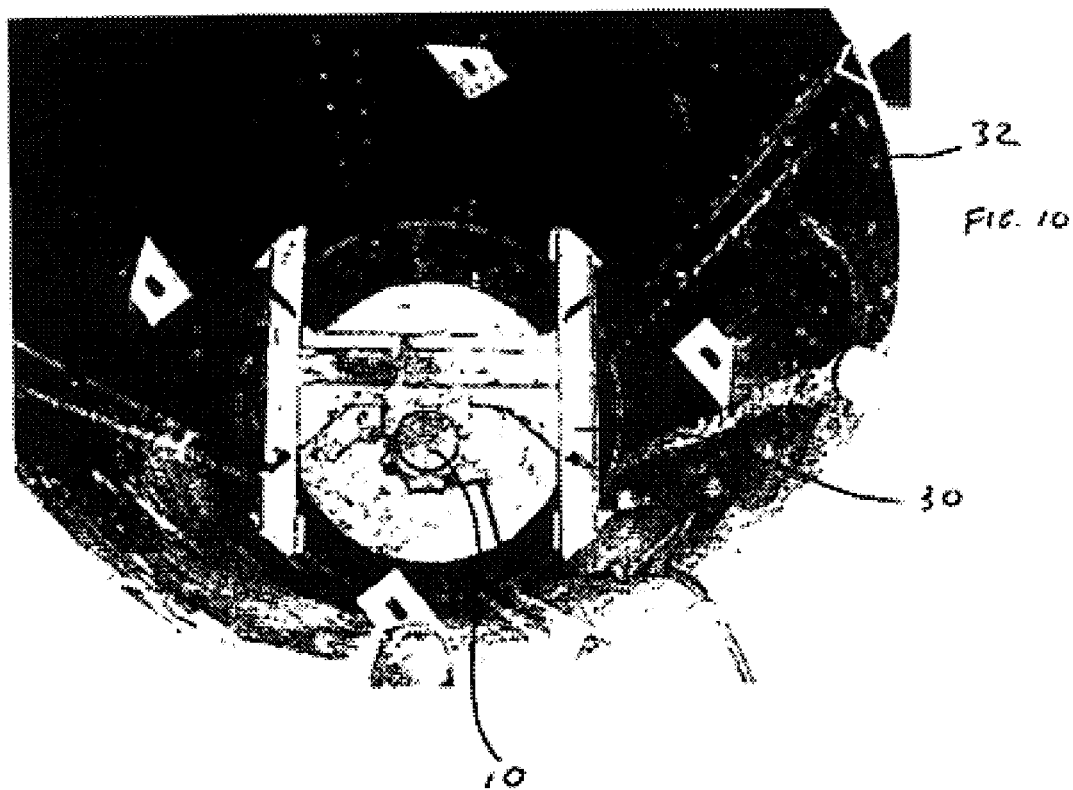
FIG. 10 is a top elevation view of the vibrator rig of FIG. 9 supporting the variable frequency/amplitude electric vibrator of FIG. 1 within a coreless electric induction furnace.

During installation of refractory lining walls according to the present method, the electric vibrator is placed in operational communication with an element capable of transmitting vibration from the vibrator to the dry refractory material. This element may be a structural member of the furnace, a liner form 32 placed within the furnace, or a vibrator rig or frame 30 which cradles the vibrator 10, as shown in FIGS. 9 and 10. The vibrator rig 30, 30' may be attached to the liner form 32, for example, by welding the rig to gussets or tabs extending inwardly from the liner form. Preferably, the vibrator 10 is secured to the rig 30, 30' by fasteners such as bolts. In a particularly preferred embodiment, the gussets are arranged such that the rig 30, 30' may be supported on the gussets while the bolts are fastened such that the installation of the rig 30, 30' can be accomplished without supporting the rig 30, 30' from a crane or requiring that an installer be positioned inside the furnace and underneath the suspended rig 30, 30' during installation. Examples of vibrator rigs 30', 30' are shown in FIGS. 6A and B and FIGS. 7A and B, respectively.

Figures 13A, 13B:
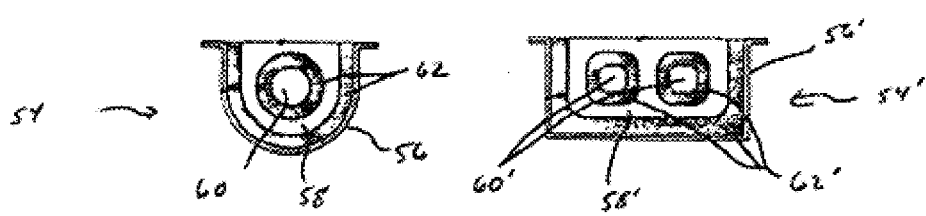
FIG. 13A is a schematic end view of a U-shaped inductor with a single channel form and a cylindrical bushing that may be used with a channel electric induction furnace of the type shown in FIG. 12.
FIG. 13B is a schematic end view of a rectangular inductor including a double loop channel form and two rectangular bushings that may be used with a channel electric induction furnace of the type shown in FIG. 12.

An electric vibrator preferably is positioned so that it effectively transmits vibration to the entire volume of the dry refractory being installed for at least the duration of a complete operational cycle (including first and second operational modes). For installation of a refractory lining wall, a single vibrator may be positioned initially in operational communication with the dry refractory material in the lowermost portion of the wall and then repositioned in operational communication with the dry refractory material in successively higher portions of the wall after completion of an operational cycle. For example, the vibrator may be supported on the lowest tier of a vibrating rig 30 and then relocated to the next higher tier when the operational cycle has been completed. Multiple vibrators also may be positioned in operational communication with dry refractory material at a single wall elevation and used concurrently. Alternatively, multiple vibrators positioned in operational communication with the dry refractory material at different wall elevations and used concurrently. Preferably, the multiple vibrators are moved from lower elevations to higher elevations when repositioning of the vibrators is necessary to transmit vibration to the entire volume of the dry refractory material in the wall. For installation of a refractory lining floor portion, a vibrating floor plate may be attached to at least one vibrator that engages the upper surface of the dry refractory material The vibrator preferably is oriented such that the shaft rotates about an axis selected to maximize refractory densification. For installation of refractory lining in a wall 72 of a coreless furnace 50 or the uppercase 74 of a channel furnace 52, the shaft 18 of the vibrator 10 preferably rotates about a vertical axis, which is 90 degrees from that used for conventional form vibration of the walls. This vibrator position generates greater centrifugal force, which transfers more energy to the liner form. For installation of refractory lining in the inductor 54, 54' of a channel furnace, such as those shown in FIGS. 13A and B, the shaft 18 of the vibrator 10 preferably rotates about a horizontal axis to induce flow in and compact refractory material 62, 62' between the inductor casing 56, 56' and the channel form 58, 58' and between the channel form 58, 58' and the bushing(s) 60, 60'. Depending on the size of the inductor, multiple vibrator mounting locations or multiple vibrators may be required to effectively densify the dry refractory material.

The method of the current invention may result in appreciable reductions in the labor and downtime necessary for installation of a refractory lining compared to conventional methods. For example, if installation of a lining in a particular coreless furnace would be expected to take about 10 hours using an electric vibrating tamper and about 5–6 hours using form vibration, the same installation using the method of the present invention would be expected to take about 1–3 hours.

The present method contemplates use of at least one variable frequency/amplitude electric vibrator in at least two operational modes to induce flow in and compact the dry refractory material, with the vibrator operation preferably being controlled by a programmable controller. It also may be possible to carry out the steps of the present method using a single fixed frequency/amplitude vibrator in at least some applications, although this will not densify the dry refractory material as effectively and refractory life will be reduced.

The present invention has been described with reference to a method that yields particular results when carried out under defined conditions. Other operating conditions (vibration frequency, time, and the like) are expected to produce results that vary from those described.

Throughout this specification, when a range of conditions or a group of substances is defined with respect to a particular characteristic (e.g., vibration frequency, vibration time, vibrator location, vibrator orientation, and the like) of the present invention, the present invention relates to and explicitly incorporates every specific member and combination of subranges or subgroups therein. Any specified range or group is to be understood as a shorthand way of referring to every member of a range or group individually as well as every possible subrange and subgroup encompassed therein; and similarly with respect to any subranges or subgroups therein.

Although a specific embodiment of the invention has been described in detail, it is understood that variations may be made thereto by those skilled in the art without departing from the spirit of the invention or the scope of the appended claims.

We claim:

1. A method of installing a refractory lining in a wall of an electric induction furnace, the method comprising the steps of:

providing a dry refractory material between a liner form placed within the furnace and a furnace wall;

placing at least one variable frequency/amplitude electric vibrator in operational communication with an element selected from a structural member of the furnace, the liner form, and a vibrator rig placed within the furnace;

inducing flow of the dry refractory material by operating at least one variable frequency/amplitude vibrator in a first operational mode having a high amplitude, low frequency vibration; and compacting the dry refractory material by operating at least one variable frequency/amplitude vibrator in a second operational mode having low amplitude, high frequency vibration after inducing flow of the dry refractory material.

2. The method according to claim 1, further comprising the step of:

providing additional dry refractory material between the liner form and the furnace wall before compacting the dry refractory material.

3. The method according to claim 1, wherein at least one variable frequency/amplitude vibrator has a rotating shaft and the method further comprises the step of:

causing the shaft to rotate in a first rotational direction in the first operational mode and in a second rotational direction in the second operational mode.

4. The method according to claim 1, wherein at least one variable frequency/amplitude vibrator has a rotating shaft and the method further comprises the step of:

selecting a shaft rotational axis to maximize refractory densification.

5. The method according to claim 1, wherein at least one variable frequency/amplitude vibrator has a rotating shaft and the method further comprises the steps of:

causing the shaft to rotate in a first rotational direction in the first operational mode and in a second rotational direction in the second operational mode; and selecting a shaft rotational axis to maximize refractory densification.

6. The method according to claim 1, further comprising the step of:

providing a programmable controller in operational communication with at least one variable frequency/amplitude vibrator, the controller being capable of storing and sending instructions for direction of vibrator shaft rotation, vibrator speed, and time of vibrator operation and storing instructions for preselected operational modes, each operational mode defining a direction of vibrator shaft rotation, vibrator speed, and time of vibrator operation.

7. The method according to claim 6, further comprising the step of:

causing the programmable controller to store instructions for at least one preselected operational mode.

8. A method of installing a refractory lining in a wall of an electric induction furnace, the method comprising the steps of:

providing a dry refractory material between a liner form placed within the furnace and a furnace wall;

placing at least one variable frequency/amplitude electric vibrator in operational communication with an element selected from a structural member of the furnace, the liner form, and a vibrator rig placed within the furnace;

operating at least one variable frequency/amplitude vibrator in a first operational mode having a high amplitude, low frequency vibration such that flow of the dry refractory material is induced and the volume of the dry refractory material is reduced; and operating at least one variable frequency/amplitude vibrator in a second operational mode having a low amplitude, high frequency vibration such that compaction of the dry refractory material occurs after flow of the dry refractory material is induced.

9. The method according to claim 8, further comprising the step of:

providing additional dry refractory material between the liner form and the furnace wall before compacting the dry refractory material.

10. A method of installing a refractory lining in a wall of an electric induction furnace, the method consisting essentially of the steps of:

providing a dry refractory material between a liner form placed within the furnace and a furnace wall;

placing at least one variable frequency/amplitude electric vibrator in operational communication with an element selected from a structural member of the furnace, the liner form, and a vibrator rig placed within the furnace;

inducing flow of the dry refractory material by operating at least one variable frequency/amplitude vibrator in a first operational mode having a high amplitude, low frequency vibration; and compacting the dry refractory material by operating at least one variable frequency/amplitude vibrator in a second operational mode having a low amplitude, high frequency vibration after inducing flow of the dry refractory material.

11. A method of installing a refractory lining in a wall of an electric induction furnace, the method comprising the steps of:

providing a dry refractory material between a liner form placed within the furnace and a furnace wall;

placing at least one variable frequency/amplitude electric vibrator having a rotating shaft in operational communication with an element selected from a structural member of the furnace, the liner form, and a vibrator rig placed within the furnace;

inducing flow of the dry refractory material by operating at least one variable frequency/amplitude vibrator in a first operational mode having a low frequency vibration and a first shaft rotational direction; and compacting the dry refractory material by operating at least one variable frequency/amplitude vibrator in a second operational mode after inducing flow of the dry refractory material, the second operational mode having a high frequency vibration and a second shaft rotational direction, the said first shaft rotational direction causing the vibrator to vibrate at high amplitude and the second shaft rotational direction causing the vibrator to operate at low amplitude.

12. The method according to claim 11, further comprising the step of:

adding additional dry refractory material between the liner form and the furnace wall after the volume of the dry refractory material has been reduced.

13. The method according to claim 11, wherein at least one variable frequency/amplitude vibrator has a rotating shaft and the method further comprises the step of:

selecting a shaft rotational axis to maximize refractory densification.

14. The method according to claim 11, further comprising the step of:

providing a programmable controller in operational communication with at least one variable frequency/ amplitude vibrator, the controller being capable of storing and sending instructions for direction of vibrator shaft rotation, vibrator speed, and time of vibrator operation and storing instructions for preselected operational modes, each operational mode defining a direction of vibrator shaft rotation, vibrator speed, and time of vibrator operation.

15. The method according to claim 14, further comprising the step of:

causing the programmable controller to store instructions for at least one preselected operational mode.

16. A method of installing a refractory lining in a wall of an electric induction furnace, the method comprising the steps of:

providing a first quantity of a dry refractory material between a liner form placed within the furnace and the furnace wall;

placing at least one variable frequency/amplitude electric vibrator having a rotating shaft in operational communication with an element selected from a structural member of the furnace, the liner form, and a vibrator rig placed within the furnace;

inducing flow of the dry refractory material by operating at least one variable frequency/amplitude vibrator in a first operational mode having a high amplitude, low frequency vibration in the first operational mode;

compacting the dry refractory material by operating at least one variable frequency/amplitude vibrator in a second operational mode having a low amplitude, high frequency vibration after inducing flow of the dry refractory material; and providing a programmable controller in operational communication with at least one variable frequency/amplitude vibrator, the controller being capable of storing and sending instructions for direction of vibrator shaft rotation, vibrator speed, and time of vibrator operation, a first direction of vibrator shaft rotation causing operation of the vibrator at high amplitude and a second direction of vibrator shaft rotation causing operation of the vibrator at low amplitude.

17. The method according to claim 16, wherein the programmable controller is capable of storing instructions for preselected operational modes, each operational mode defining a direction of vibrator shaft rotation, vibrator speed, and time of vibrator operation and the method further comprises the step of:

causing the programmable controller to store instructions for at least one preselected operational mode.

18. A method of installing a refractory lining in the floor portion of an electric induction furnace, the method comprising the steps of:

providing a dry refractory material in the floor portion of the furnace;

providing at least one variable frequency/amplitude electric vibrator equipped with a vibrating bottom plate; and compacting the dry refractory material by causing the vibrating bottom plate to engage the dry refectory material when at least one variable frequency/amplitude vibrator is in an operational mode having a low amplitude, high frequency vibration after inducing flow of the dry refractory material.

19. The method according to claim 18, further comprising the step of:

inducing flow of the dry refractory material before the compacting step by causing the vibrating bottom plate to engage the dry refractory material when at least one variable frequency/amplitude vibrator is in an operational mode having a high amplitude, low frequency vibration.

20. The method according to claim 18, further comprising the step of:

preparing the installed refractory lining floor portion for wall installation by scratching the surface of the periphery of the floor portion.

21. The method according to claim 18, wherein at least one variable frequency/amplitude vibrator has a rotating shaft and the method further comprises the step of:

causing the shaft to rotate in a first rotational direction in the first operational mode and in a second rotational direction in the second operational mode.

22. The method according to claim 18, further comprising the step of:

providing a programmable controller in operational communication with at least one variable frequency/amplitude vibrator, the controller being capable of storing and sending instructions for direction of vibrator shaft rotation, vibrator speed, and time of vibrator operation and storing instructions for preselected operational modes, each operational mode defining a direction of vibrator shaft rotation, vibrator speed, and time of vibrator operation.

23. The method according to claim 22, further comprising the step of:

causing the programmable controller to store instructions for at least one preselected operational mode.

24. A method of installing a refractory lining in an electric induction furnace, the method comprising the steps of:

installing a refractory lining in the floor portion of the furnace;

providing a dry refractory material between a liner form placed on the floor portion of the refractory lining and the furnace wall;

placing at least one variable frequency/amplitude electric vibrator in operational communication with an element selected from a structural member of the furnace, the liner form, a vibrator rig placed within the furnace;

inducing flow of the dry refractory material by operating at least one variable frequency/amplitude vibrator in a first operational mode having a high amplitude, low frequency vibration; and compacting the dry refractory material by operating at least one variable frequency/amplitude vibrator in a second operational mode having a low amplitude, high frequency vibration after inducing flow of the dry refractory material.

25. The method according to claim 24, further comprising the step of:

adding additional dry refractory material between the liner form and the furnace wall before compacting the dry refractory material.

26. The method according to claim 24, wherein at least one variable frequency/amplitude vibrator has a rotating shaft and the method further comprises the step of:

causing the shaft to rotate in a first rotational direction in the first operational mode and in a second rotational direction in the second operational mode.

27. The method according to claim 24, wherein at least one variable frequency/amplitude vibrator has a rotating shaft and the method further comprises the step of:

selecting a shaft rotational axis to maximize refractory densification.

28. The method according to claim 24, further including the step of:

provding a programmable controller in operational communication with at least one variable frequency/amplitude vibrator, the controller being capable of storing and sending instructions for direction of vibrator shaft rotation, vibrator speed, and time of vibrator operation and storing instructions for preselected operational modes, each operational mode defining a direction of vibrator shaft rotation, vibrator speed, and time of vibrator operation.

29. The method according to claim 28, further comprising the step of:

causing the programmable controller to store instructions for at least one preselected operational mode.

30. The method according to claim 24, wherein the step of installing a refractory lining in the floor portion of the furnace comprises the steps of:

providing a dry refractory material in the floor portion of the furnace;

attaching a vibrating bottom plate to at least one variable frequency/amplitude electric vibrator; and compacting the dry refractory material in the furnace floor portion by causing the vibrating bottom plate to engage the dry refectory material in the furnace floor portion when the attached variable frequency/amplitude vibrator is in an operational mode having a low amplitude, high frequency vibration.

31. The method according to claim 30, further comprising the step of:

inducing flow of the dry refractory material in the furnace floor portion before the compacting step by causing the vibrating bottom plate to engage the dry refectory material in the furnace floor portion when the attached variable frequency/amplitude vibrator in an operational mode having a high amplitude, low frequency vibration.

32. The method according to claim 31, further comprising the step of:

preparing the installed refractory lining floor portion for wall installation by scratching the periphery of the surface of the floor portion.

33. A method of installing a refractory lining in an inductor of an electric channel induction furnace, the method comprising the steps of:

placing a channel form inside an inductor casing;

installing at least one bushing spaced at a distance from the interior of the channel form;

filling the inductor casing with dry refractory material;

placing at least one variable frequency/amplitude electric vibrator in operational communication with an element selected from the inductor casing and the channel form;

inducing flow of the dry refractory material by operating at least one variable frequency/amplitude vibrator in a first operational mode having a high amplitude, low frequency vibration; and compacting the dry refractory material by operating at least one variable frequency/amplitude vibrator in a second operational mode having low amplitude, high frequency vibration after inducing flow of the dry refractory material.

34. A method of installing a refractory lining in a wall of an electric induction furnace, the method comprising the steps of:

providing a dry refractory material between a liner form placed within the furnace and a furnace wall;

placing at least one electric vibrator in operational communication with an element selected from a structural member of the furnace, the liner form, and a vibrator rig placed within the furnace;

inducing flow of the dry refractory material by operating at least one electric vibrator in a first operational mode having a high amplitude, low frequency vibration; and compacting the dry refractory material by operating at least one electric vibrator in a second operational mode having low amplitude, high frequency vibration after inducing flow of the dry refractory material.

* * * * *